(12) United States Patent
Soelberg

(10) Patent No.: US 7,333,836 B2
(45) Date of Patent: Feb. 19, 2008

(54) SYSTEM AND METHOD FOR PROVIDING MOBILE DEVICE CAPABILITY TO A WIRELESS NETWORK SUBSCRIBER

(75) Inventor: Emily Lyons Soelberg, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 676 days.

(21) Appl. No.: 10/902,808

(22) Filed: Aug. 2, 2004

(65) Prior Publication Data

US 2006/0030368 A1 Feb. 9, 2006

(51) Int. Cl.
H04B 1/38 (2006.01)
H04M 1/00 (2006.01)

(52) U.S. Cl. .................... 455/567; 455/412.1; 455/566

(58) Field of Classification Search ................ 455/567, 455/414.1, 566, 401, 412.1, 412.2, 414.4, 455/415, 416, 432.3, 433, 435.1, 461, 466, 455/458, 400; 320/352, 254
See application file for complete search history.

(56) References Cited

U.S. PATENT DOCUMENTS 5,983,117 A * 11/1999 Sandler et al. .............. 455/557
7,062,256 B2 * 6/2006 Benco et al. ............ 455/412.2
2002/0119794 A1   8/2002 Byers et al.
2005/0085220 A1 * 4/2005 Benco et al. ............ 455/414.1
2007/0097879 A1 * 5/2007 Bleckert et al. ............ 370/254
2007/0165599 A1 * 7/2007 Skog et al. .................. 370/352

* cited by examiner

Primary Examiner—Pablo N. Tran
(74) Attorney, Agent, or Firm—Michael J. Donohue; Davis Wright Tremaine LLP

(57) ABSTRACT

A method and system for alerting a mobile network subscriber to capabilities of a mobile station associated with a contact of the subscriber. The system receives registration information from the contact mobile station, whereupon an IMEI number of the contact mobile station is stored by the system in an IMEI database. The system constructs a table that is preferably stored in the IMEI database and includes information concerning the contact mobile station, including IMEI number and phone number of the contact mobile station. When a mobile network in the system subsequently receives a phone call to the contact mobile station, the system associates the phone number with the contact mobile station IMEI number stored in the IMEI database. Information including the contact mobile station capabilities stored in the IMEI database is then forwarded to a mobile station of the mobile network subscriber, and preferably displayed as an icon on the subscriber's mobile station.

13 Claims, 14 Drawing Sheets

Figure 2

| Hardware Model | Mail Type | Enhanced Features |
|---|---|---|
| Smith T-12000 | Email | Color display |
| Smith T-16000 | Email | VideoPhone |
| Smith T-18000 | Internet | VideoPhone, MP3 |

Figure 3

| IMEI # | Phone # | Hardware Model | Mail Type | Enhanced Features |
|---|---|---|---|---|
| 12345 | 12345679 | Smith T-16000 | Email | VideoPhone |

Figure 4

| Phone # | Name | Email Address | Organization |
|---|---|---|---|
| 12345679 | Susan Smith | susan.smith@uol.com | Marketing Dept. |

Previous
Table

| IMEI # | Phone # | Hardware Model | Mail Type | Enhanced Features |
|---|---|---|---|---|
| 12345 | 12345679 | Smith T-16000 | Email | VideoPhone |

New Table

| IMEI # | Phone # | Hardware Model | Mail Type | Enhanced Features |
|---|---|---|---|---|
| 12345 | 12355999 | Smith T-16000 | Email | VideoPhone |

SYSTEM AND METHOD FOR PROVIDING MOBILE DEVICE CAPABILITY TO A WIRELESS NETWORK SUBSCRIBER

BACKGROUND

1. Field of the Invention

The present invention relates generally to wireless communications. More specifically, the present invention relates to providing information about wireless devices associated with subscribers to a communications network.

2. Background of the Invention

As mobile communications devices, or mobile stations (MS), play an increasing role in society, capabilities of devices are being continually enhanced. Initially, mobile devices such as cell phones were used primarily to host telephone conversations. With the proliferation of pagers, personal digital assistants (PDAs) and other mobile devices, short text messages, email, and web content can now be conveniently sent to and from a mobile user.

In addition to increasing the type of information that a mobile user can receive at an MS, technology advances also can enhance the quality of communication, by providing multiple capabilities in a single MS. Thus, it is typical for a subscriber to a mobile communications service to have voice, email, web-browsing, and short message capability integrated in a single MS device. While the ability to include multiple communications capability in a single MS may enhance the efficiency of an individual MS user, often a user may wish to interact with other MS users through more than one communications method. For example, in business transactions, a first MS user may wish to talk to a second user, and additionally, transmit an email message to the second user. If the second user is operating an MS that is not capable of receiving email, the quality of the interaction between the first and second users is less than ideal, resulting in a loss of productivity. Thus, the overall productivity of an MS user may be limited by the capability not only of the user's own MS device, but that of other users with whom she may be in contact using mobile communications. The value associated with a network of such MS users will thus be limited according to the capability of mobile devices associated with network users. Additionally, even if a second user operates a mobile station with advanced capabilities, a first user unaware of such capabilities may fail to make productive use of the capabilities of the second user's mobile station.

In light of the foregoing, there is a need to provide information to a mobile station user about mobile stations belonging to contact of the user, in order to enhance the productivity of the mobile station user.

BRIEF SUMMARY OF THE INVENTION

In an embodiment of the present invention, a system for alerting a mobile network subscriber about capabilities of a separate mobile station registered with the network comprises a home location register to receive registration messages from the separate (contact) mobile station. The system also includes a subscriber contact book database that stores information associated with contacts of the mobile station subscriber. Preferably, the subscriber enters contact information in a mobile station, which can then transmit the contact information to the subscriber contact book database. The system further includes an international mobile equipment number (IMEI) database that stores information related to mobile stations associated with the mobile network subscriber contacts, including IMEI numbers associated with contact mobile stations. The IMEI database is preferably configured to store predetermined features that are characteristic of the mobile station model associated with the IMEI database. In addition, the system includes a program that operates on a mobile station device associated with the mobile network subscriber, so that one or more of the predetermined features of a subscriber contact mobile station that are stored in the IMEI database can be displayed as an icon on the subscriber's mobile station, in response to a message designating the contact mobile station.

In another embodiment of the present invention, a method for providing information to a mobile network subscriber concerning capabilities of a contact mobile station includes receiving in the mobile network a registration message from the contact mobile station. When the contact mobile station registers with the mobile network, the registration information preferably includes a phone number and information identifying the contact mobile station, such as an (IMEI). The registration information also preferably includes a phone number associated with the contact mobile station. Using information contained in the IMEI database, the system is enabled to associate the IMEI number of the contact mobile station with a set of predetermined features of the contact mobile station. Preferably, the IMEI number is stored in the IMEI database along with the set of predetermined features. When the system subsequently receives a message designating the contact mobile station, an alerting message is sent to the mobile network subscriber, including the set of predetermined features associated with the contact mobile station. For example, when the subscriber dials a number associated with the contact mobile station, the system checks to see if the number dialed is included in the IMEI database. The system then retrieves information related to the set of predetermined features of the contact mobile station that are stored in the IMEI database, and forwards the information to the mobile network subscriber. In an exemplary embodiment, the forwarded information is displayed as an icon indicating videotelephony capability of the contact MS.

In another embodiment of the present invention, a method for updating a mobile network subscriber concerning mobile station capabilities associated with a subscriber contact comprises receiving information including a new mobile station IMEI number and a mobile station phone number associated with the contact mobile station. In an additional step, the IMEI database of the network subscriber is checked to ascertain if the new mobile station IMEI number is contained therein. If the new mobile station IMEI number is not already contained within the IMEI database, a table associated with the network subscriber that contains the phone number of the contact mobile station associated with the new IMEI is updated. In a subsequent step, a message containing the contact mobile station phone number is received. After receiving the message, an alerting message to a mobile station associated with the network subscriber is sent. Preferably, the alerting message includes capabilities of a mobile station associated with the new mobile station IMEI number.

BRIEF DESCRIPTION OF THE DRAWINGS

FIG. 2 illustrates a mobile station hardware table contained in an IMEI database according to another exemplary embodiment of the present invention.

FIG. 3 illustrates a user mobile station table contained in an IMEI database according to another exemplary embodiment of the present invention.

FIG. 4 illustrates a subscriber contact table contained in a contacts database according to another exemplary embodiment of the present invention.

FIGS. 6a and 6b illustrate examples of initial and updated user mobile station tables.

DETAILED DESCRIPTION OF THE INVENTION

Figure 1:
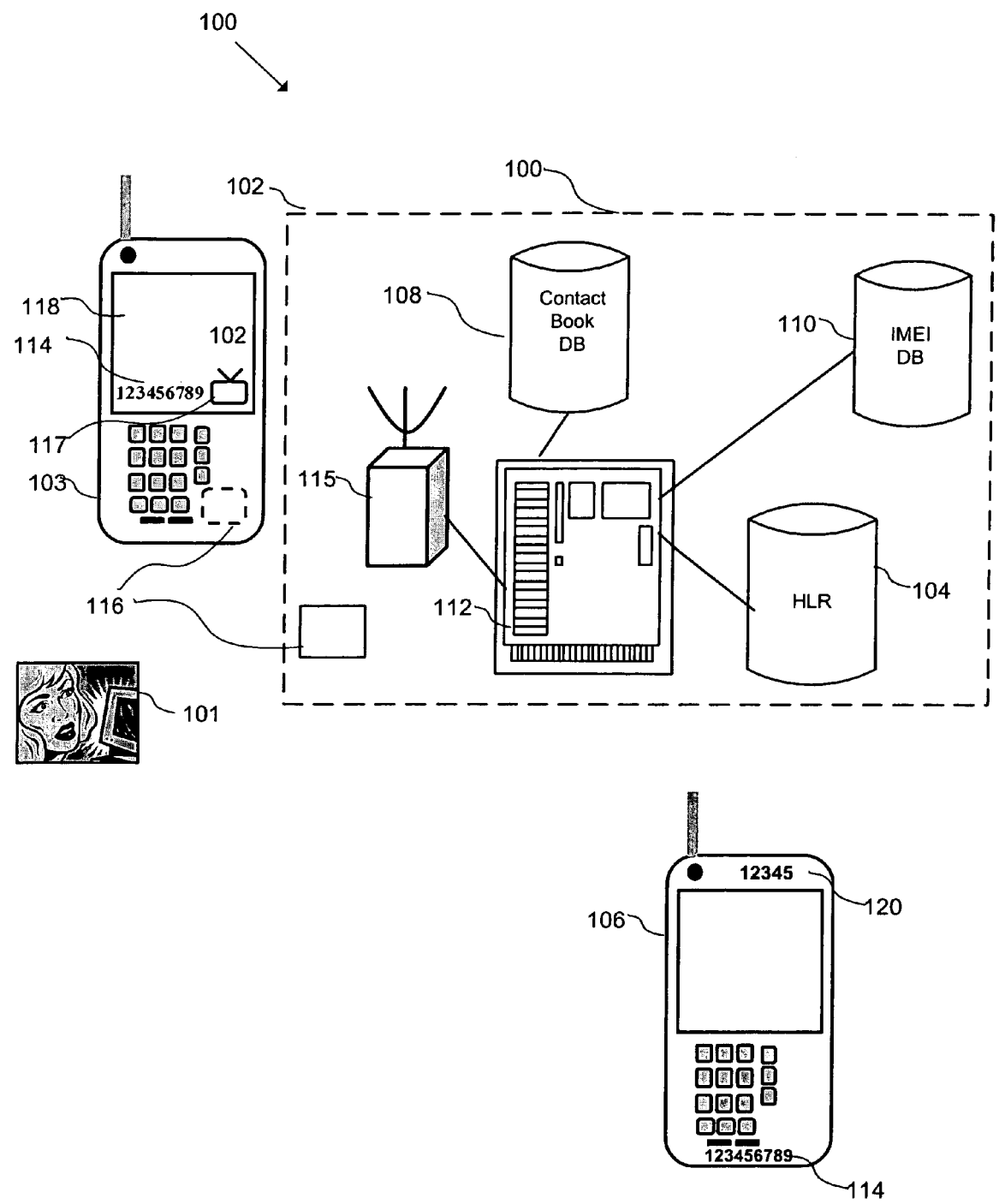
FIG. 1 illustrates a system for alerting a mobile network subscriber of mobile station capabilities associated with a subscriber contact, according to an exemplary embodiment of the present invention.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

FIG. 1 illustrates system 100 for providing a mobile network subscriber 101 (having a video-telephony equipped mobile station (MS) 103 associated therewith) with information related to capabilities of mobile stations associated with contacts of the subscriber that have registered with the network 102. System 100 includes home location register (HLR) 104 for collecting information when a MS 106 registers with the network.

Also included is a contact book database 108 for storing information related to contacts of subscriber 101. Contacts may include business associates, colleagues, or other persons whose information the subscriber designates to be stored in system 100. Preferably, the contact information includes a set of features associated with each contact of subscriber 101, including contact name and telephone number. Information is entered and stored by subscriber 101 in contact book database 108, for example, when mobile station 103 belonging to the subscriber is registered with network 102.

When contact mobile station (MS) 106 registers with network 102, system 100 can collect mobile station information including an international mobile equipment identity (IMEI, or IMEI number) that is a feature common to all GSM mobile stations in current use. For example, mobile switching center (MSC) 112 may request an IMEI from MS 106, or the IMEI may be automatically forwarded from MS 106 during a registration process, and temporarily stored in HLR 104. As is known to those skilled in the art, each IMEI is a unique 15 digit number assigned to an individual MS that can be used to determine information associated with the MS, including the manufacturer and MS model type. The IMEI received by network 102 is preferably stored in IMEI database 110. Preferably, database 110 contains IMEI information associated with mobile stations of subscribers to network 102. For example, MSC 112 can forward to database 110 information such as an IMEI number 120 of MS 106 after it is requested by network 102 and initially stored in HLR 104.

Preferably, as illustrated in FIG. 2, IMEI database 110 also contains hardware information concerning commonly used mobile station models. Table 200 located in database 110 contains information such as an MS model, mail capability, and enhanced features associated with each of a plurality of MS models. Such information is periodically collected by system 100 and entered into database 110. Alternatively, table 200 can be located in a separate hardware database (not shown). Referring again to FIG. 1, by requesting the IMEI number of registering mobile station 106, system 100 can create a contact mobile station table 300 that lists IMEI number 120, MS 106 phone number 114, and MS 106 hardware model 304. Additionally, using IMEI number 120, system 100 can determine the hardware model type of contact MS 106. Optionally, in the embodiment shown in FIG. 3, table 300 lists important features (also termed capabilities) of contact MS 106, such as email capability (item 303) and videophone capability (item 302), as depicted in FIG. 3. In order to construct the embodiment of table 300 illustrated in FIG. 3, system 100 determines that MS 106 hardware model 202 in table 200 corresponds to features 204 and 206, which appear as items 302 and 303, respectively, in table 300. In other embodiments, other features associated with a mobile station, such as MP3 capability or Push-to-talk, could also be listed in table 300, if the latter capabilities were found in hardware table 200.

Preferably, table 300 is stored in database 110. Optionally, table 300 can be stored in contact book database 108.

In an exemplary embodiment of the present invention, the information contained in table 300 is provided to a mobile network subscriber when system 300 receives a message designating MS 106. For example, MS 106 can be designated when subscriber 101 dials phone number 114 associated with MS 106. System 100 can check contact book database 108, which contains subscriber contact information, to ascertain whether phone number 114 is contained therein. FIG. 4 illustrates an exemplary subscriber contact table 400 contained in database 108. Included in table 400 are a name, email address, and organization associated with a user of MS 106. System 100 can check table 300 stored in IMEI database 110 or elsewhere, to retrieve any information associated with phone number 114. Information such as videophone capability of MS 106 can then be forwarded to subscriber 101.

System 100 also includes program 116 which operates to transform the information retrieved from IMEI database 110 into a predetermined format for ease of understanding by subscriber 101. Preferably, program 116 is a software program that translates information contained in table 300 into iconic displays. For example, program 116, in response to input of information from table 300, creates an icon depicting videotelephony capability of MS 106, which is displayed on screen 118 belonging to subscriber 101. Subscriber 101, after dialing phone number 114 associated with MS 106, therefore knows that the called party has videotelephony capability. The subscriber is thus alerted in a convenient fashion that the called party in question can be interacted with more productively than, for example, in a simple audio conversation.

Figure 5A:
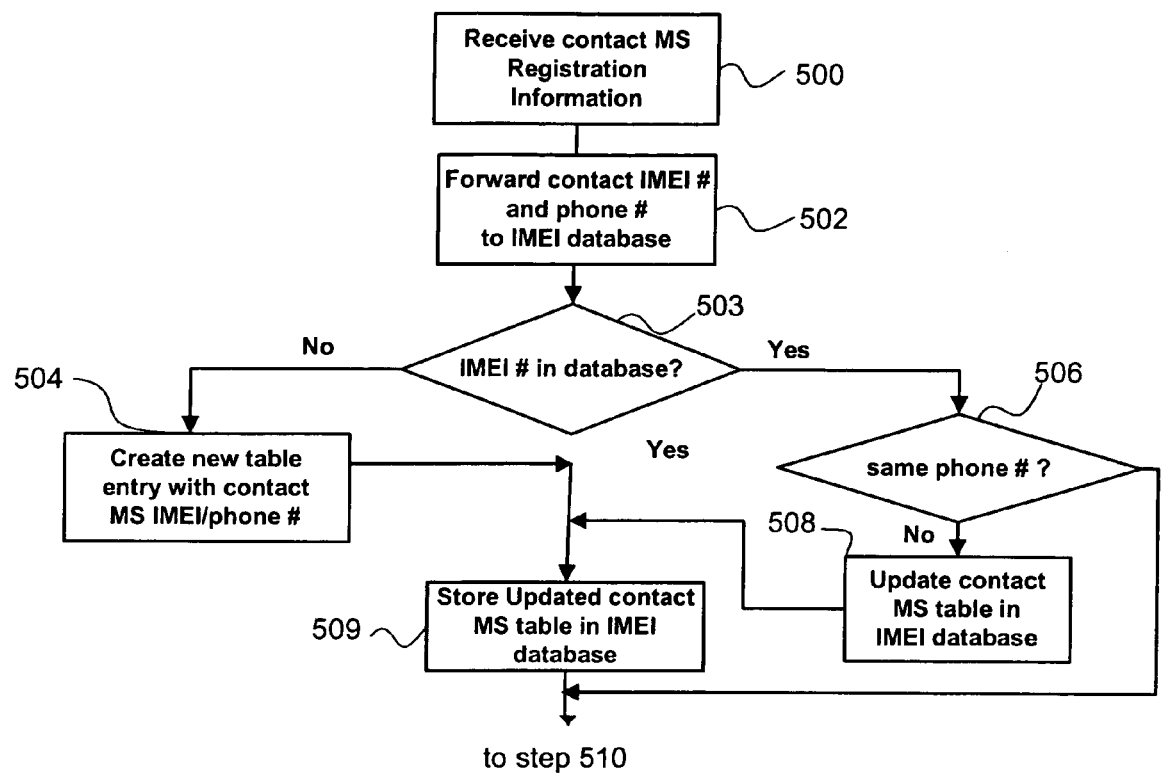
FIG. 5a illustrates exemplary steps in a process for updating an IMEI database, when a contact mobile station registers with a subscriber network, according to an exemplary embodiment of the present invention.

FIG. 5a illustrates exemplary steps in a process for updating an IMEI database, when a contact mobile station registers with a subscriber network, according to an exemplary embodiment of the present invention. Referring also to FIG. 1, in step 500, mobile station 106 registers with network 102. Information related to mobile station 106 is sent in a registration message to MSC 112 via base station controller (BSC) 115.

After forwarding registration information to HLR 104, in step 502, information included in the registration message, as well as information requested from mobile station 106 by system 100, such as an IMEI 120 and phone number 114 associated with MS 106, is forwarded to IMEI database 110.

In step 503, IMEI database 110 is queried to determine if database 110 already contains IMEI number 120 (see FIG. 1). If IMEI 120 is not found, then in step 504, system 100 creates a new table for MS 106 including, for example, IMEI 120 and phone number 114, and in step 509, the new table is stored in database 110.

If IMEI 120 is found to be present in database 110, then in step 506, system 100 checks a table, for example, table 300, to determine if the phone number of registering MS 106 is the same as that in table 300. If so, then the process can proceed to step 510 of FIG. 5b.

If the registering phone number is different from that contained in table 300, in step 508, table 300 can be updated with the new phone number received by system 100 in the registration process. In step 509, the updated table 300, as depicted in FIG. 6, is stored in database 110.

Figure 5B:
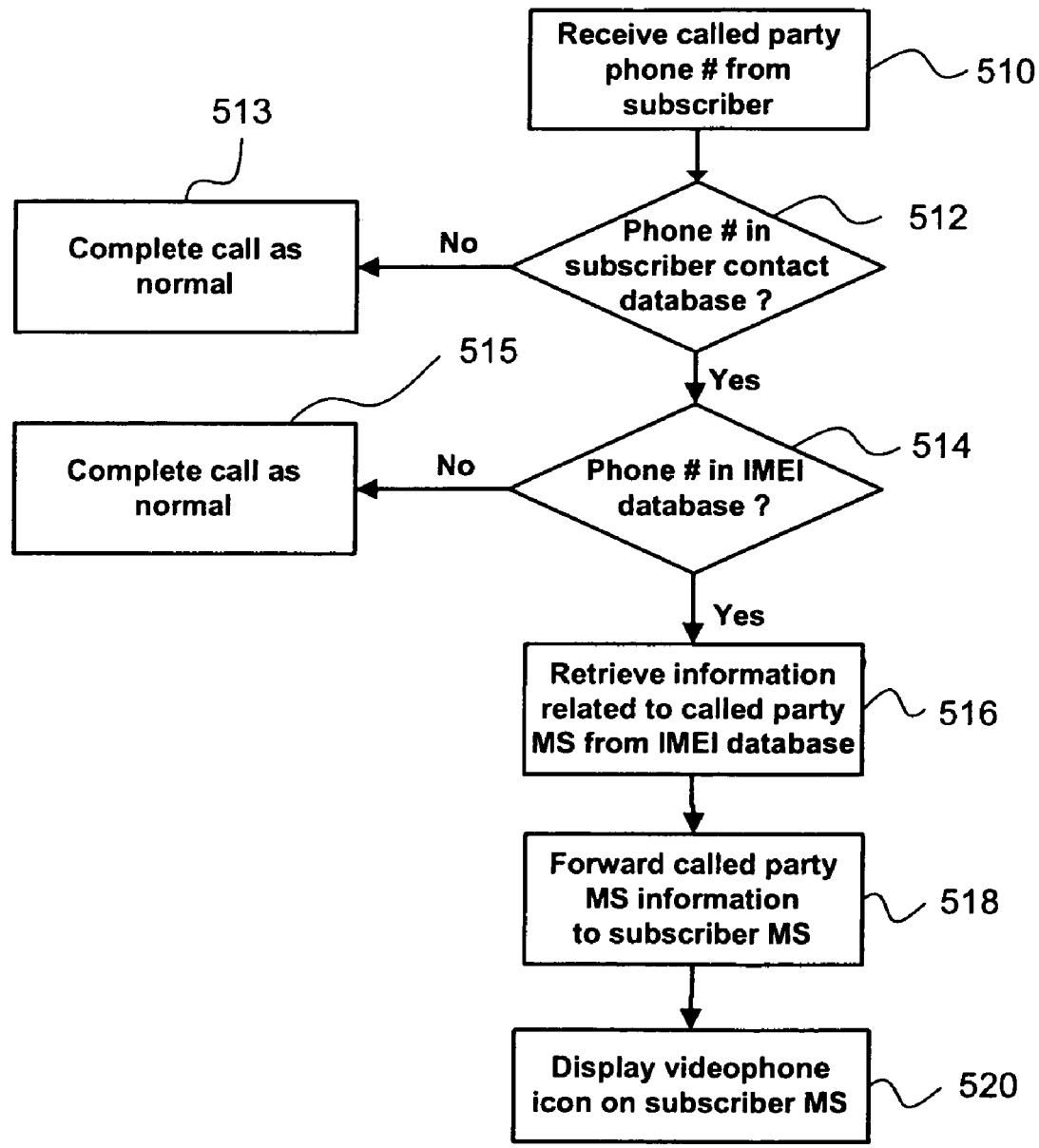
FIG. 5b illustrates exemplary steps in a process for providing a mobile network subscriber updated information about capability of a called contact mobile station, according to an exemplary embodiment of the present invention.

FIG. 5b illustrates exemplary steps in a process for providing to a mobile network subscriber updated information about capability of a called contact mobile station, according to an exemplary embodiment of the present invention.

In step 510, subscriber 101 dials contact phone number phone number 114 to initiate a conversation with the contact.

In step 512, system 100 checks subscriber contact book database 108 to determine if the dialed number 114 is contained therein. In one embodiment of the present invention, if number 114 is not present in database 108, then system 100 does not accord the call any special treatment and, in step 113, the call proceeds as normal.

If an entry of phone number 114 in database 108 is discovered, indicating that the called party is a contact of subscriber 101, then in step 514, system 100 checks IMEI database 110 to determine if information associated with phone number 114 is present. If no entry is found in IMEI database 110, system 100 accords the call no further special treatment and the call proceeds as normal.

If the system determines that phone number 114 is associated with a mobile station (MS 106), having IMEI number 120, as depicted in table 300 of FIG. 3, then the process proceeds to step 516.

In step 516, system 100 retrieves information from IMEI database 110. System 100 then creates a message to be forwarded to subscriber 101. In a preferred embodiment of the present invention, the information includes item 302 that indicates videophone capability associated with phone number 114. If table 300 is configured as depicted in FIG. 3, information about MS 106 including videotelephony capability is directly retrieved from table 300, entry 302. Alternatively, in order to minimize the sized of database 110, it may be desirable that contact tables such as table 300 are kept to a minimum size. Accordingly, in other embodiments, table 300 can contain only some information identifying MS 106, such as IMEI number 120, phone number 114 and hardware model 304. In such case, when table 300 is queried, the system finds a hardware model 304 associated with IMEI 120, from which it can retrieve enhanced features of that hardware model residing in table 200 in item 204.

In step 518, a message is sent to subscriber 101 indicating MS 106 capabilities that are contained in item 204. For example, MSC 112 sends the message to BSC 115, which forwards the message to MS 101.

In step 520, process 116 causes an icon 118 to appear next to a display of called party phone number 114 on MS 101. In an exemplary embodiment, process 116 comprises a software program resident in MS 101, that recognizes item 204 received in the message from BSC 115, to indicate that MS 106, associated with phone number 114, has videotelephony capability. Program 116 then operates to transform the information into an icon on MS 101 that represents videotelephony. As depicted in FIG. 1, an icon 117 is then displayed next to phone number 114 being called. Subscriber 101 is thus apprised of the fact that the contact being called has a videotelephone.

Figure 5C:
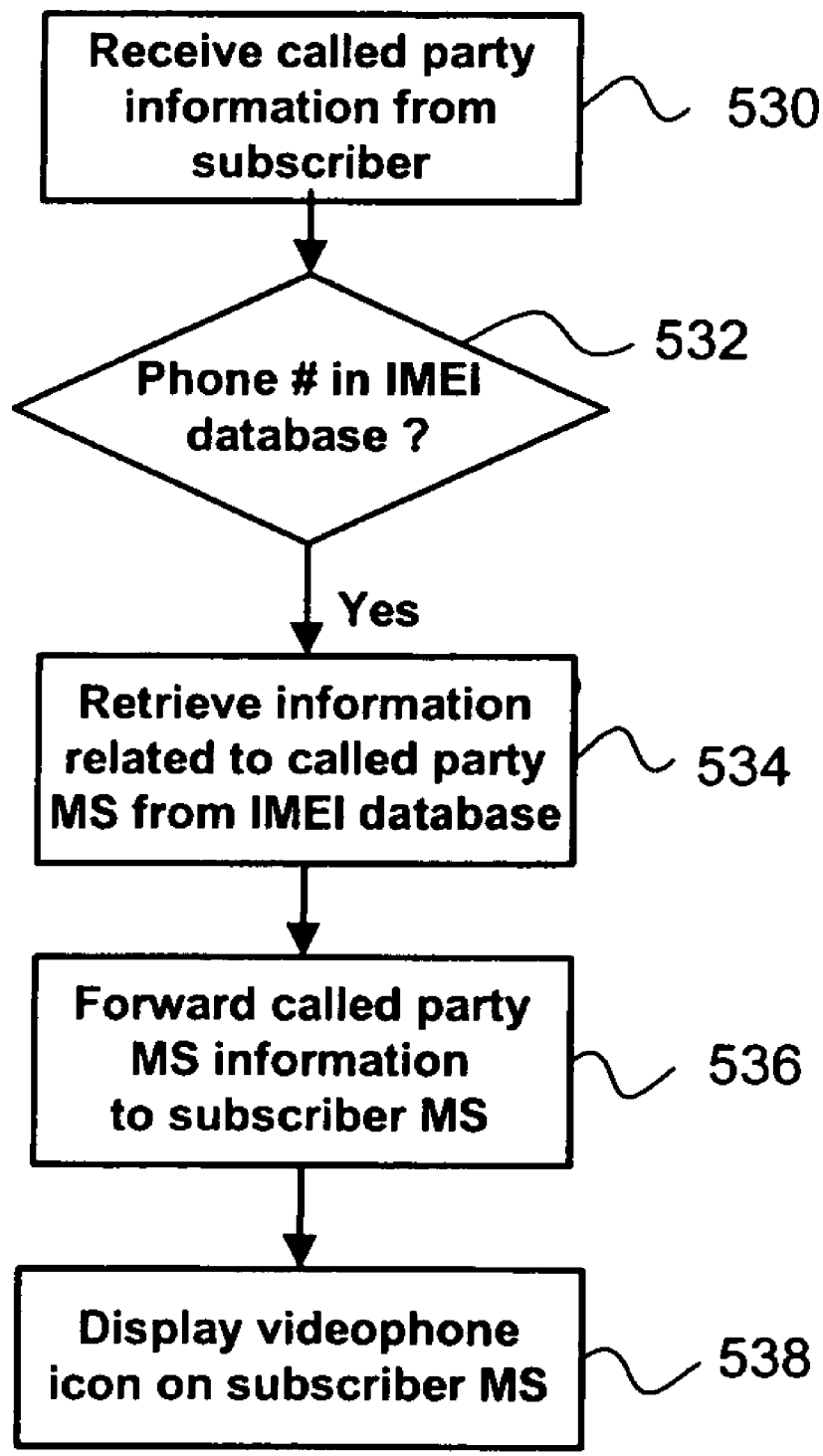
FIG. 5c illustrates exemplary steps in a process for providing a mobile network subscriber updated information about capability of mobile stations registered with the mobile network, according to an exemplary embodiment of the present invention.

FIG. 5c illustrates exemplary steps in a process for providing a mobile network subscriber updated information upon request about capability of mobile stations registered with the mobile network, according to an exemplary embodiment of the present invention.

In step 530, subscriber 101 sends a querying message to system 100 that includes contact information, such as a name or phone number 114. After entering contact information, subscriber 101 may query system 100 as to capabilities of contact MS 106, for example, by entering "update" in MS 101. The message may be sent whenever subscriber 101 is registered with network 102.

In step 532, system 100 determines that phone number 114 is associated with a mobile station (MS 106) having IMEI number 120 as depicted in table 300 of FIG. 3.

In step 534, system 100 retrieves information from table 300, and creates a message to be forwarded to subscriber 101. In a preferred embodiment of the present invention, the information includes item 302 that indicates videophone capability associated with phone number 114.

In step 536, a message is sent to subscriber 101 indicating capabilities associated with dialed MS 106.

In step 538, process 116 causes an icon 118 to appear next to a display of called party phone number 114 on MS 101.

Figure 5D:
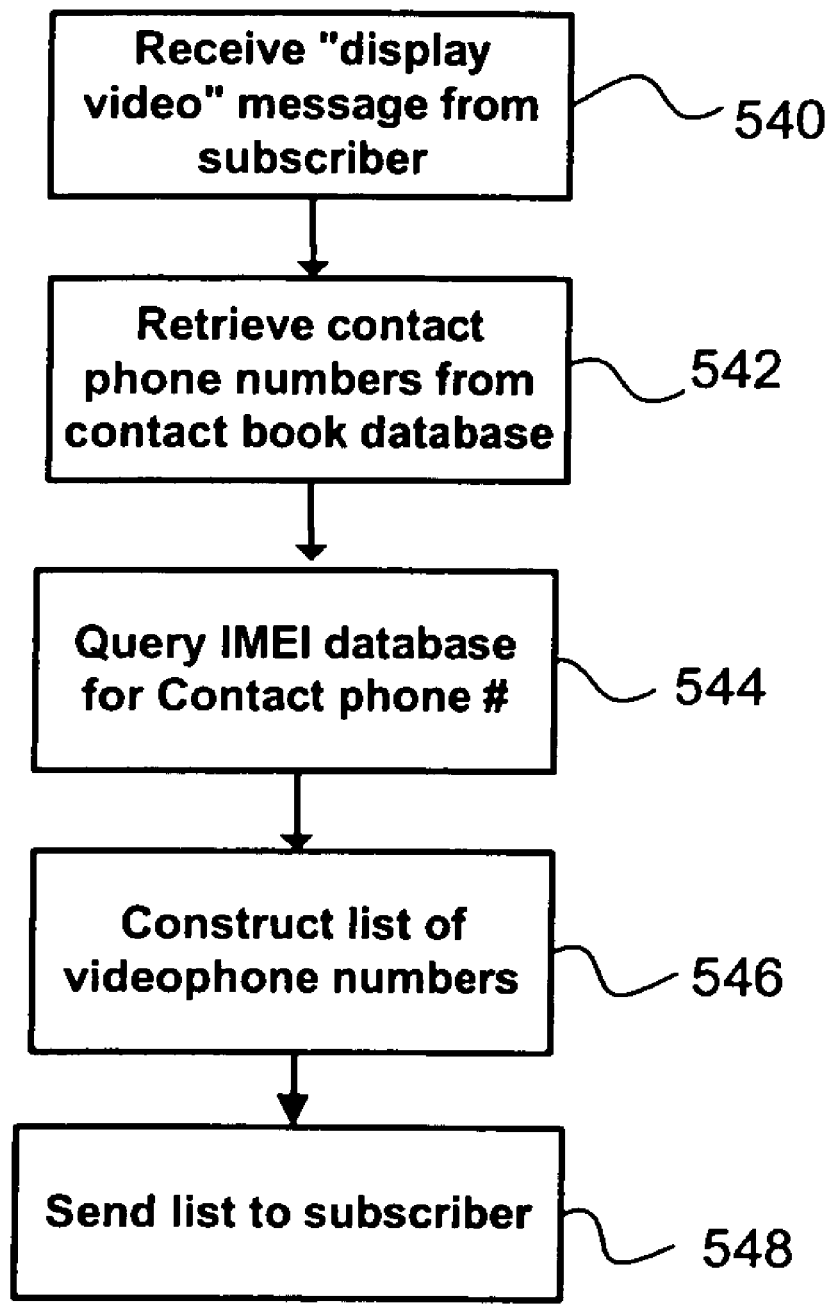
FIG. 5d illustrates process steps to display a videotelephony contact list of a mobile network subscriber, according to a further exemplary embodiment of the present invention.

In a further exemplary embodiment of the present invention illustrated in FIG. 5d, subscriber 101 can request that all contacts with videotelephony capability are provided by system 100. In step 540, subscriber 101 sends a "display video" message to system 100. In step 542, system 100 checks contact book database 108 and retrieves a list of phone numbers of contacts contained therein. In step 544, system 100 queries IMEI database 110 to determine which of the retrieved contact phone numbers are associated with IMEI numbers contained therein. In step 546, a list of videophone numbers is constructed corresponding to those contact phone numbers that correspond to IMEI numbers in database 110 that are associated with videotelephony features. In step 548, system 100 forwards the videophone list to subscriber 101.

Figure 7:
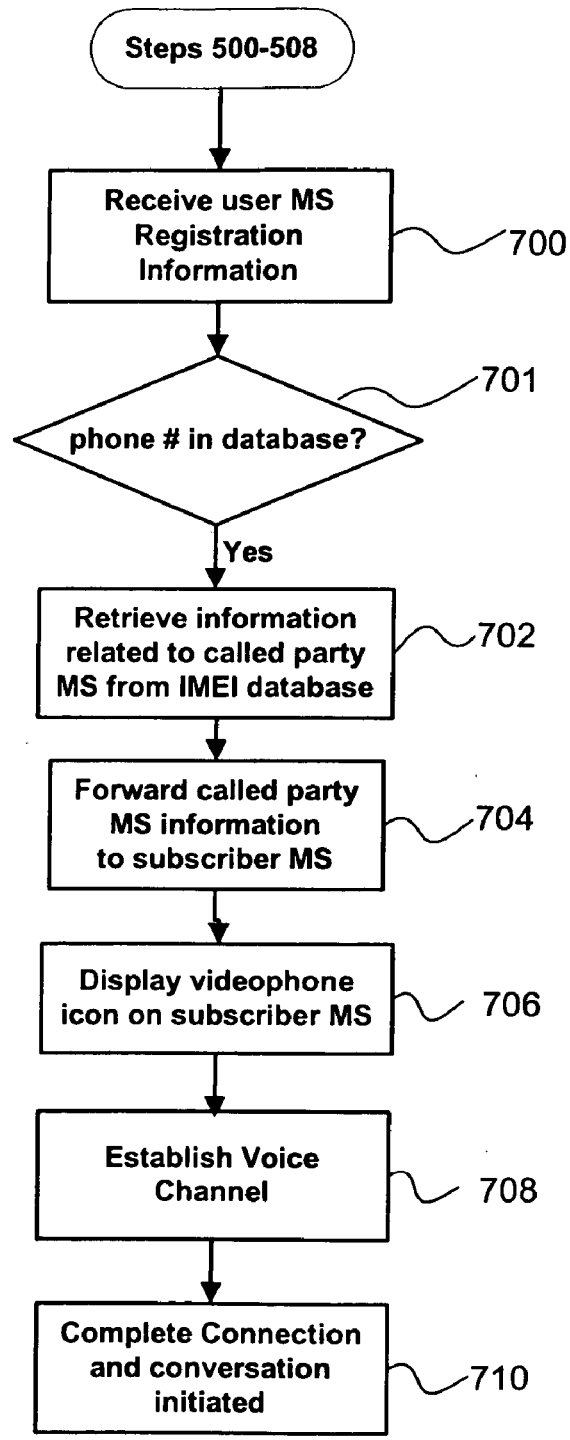
FIG. 7 depicts exemplary steps in a method for alerting a mobile network subscriber of capabilities associated with a mobile station calling the subscriber, according to an exemplary embodiment of the present invention.

In another exemplary embodiment of the present invention illustrated in FIG. 7, a mobile network subscriber receiving a call is alerted as to enhanced capabilities of the calling party mobile station. The process in FIG. 7 proceeds initially as in steps 500-508. Referring also to FIG. 1, in step 700, a user of MS 106 dials subscriber 101. System 100 receives a registration message indicating phone number 120 associated with MS 106.

In step 701, system 100 checks contact book database 108 associated with the called party, subscriber 101. It determines that phone number 114 is in the database, and flags the calling party as an important contact of called party 101. Accordingly, system 100 retrieves IMEI 120 from MS 106.

In step 702, system 100 queries IMEI database 110 to find entries associated with IMEI 120, and retrieves predetermined information from table 300, including the "enhanced features" item 302 indicating videophone capability of MS 106.

This predetermined information is forwarded in a message to MS 101 in step 704, as described above for step 518.

In step 706, an icon displaying videophone capability of MS 106 is displayed on MS 101. In step 708, a voice channel is established connecting MS 101 and MS 106.

In step 710, subscriber 101, alerted to the fact that incoming caller with phone number 114 has videotelephony capability, completes the connection and a conversation is initiated.

Figure 8:
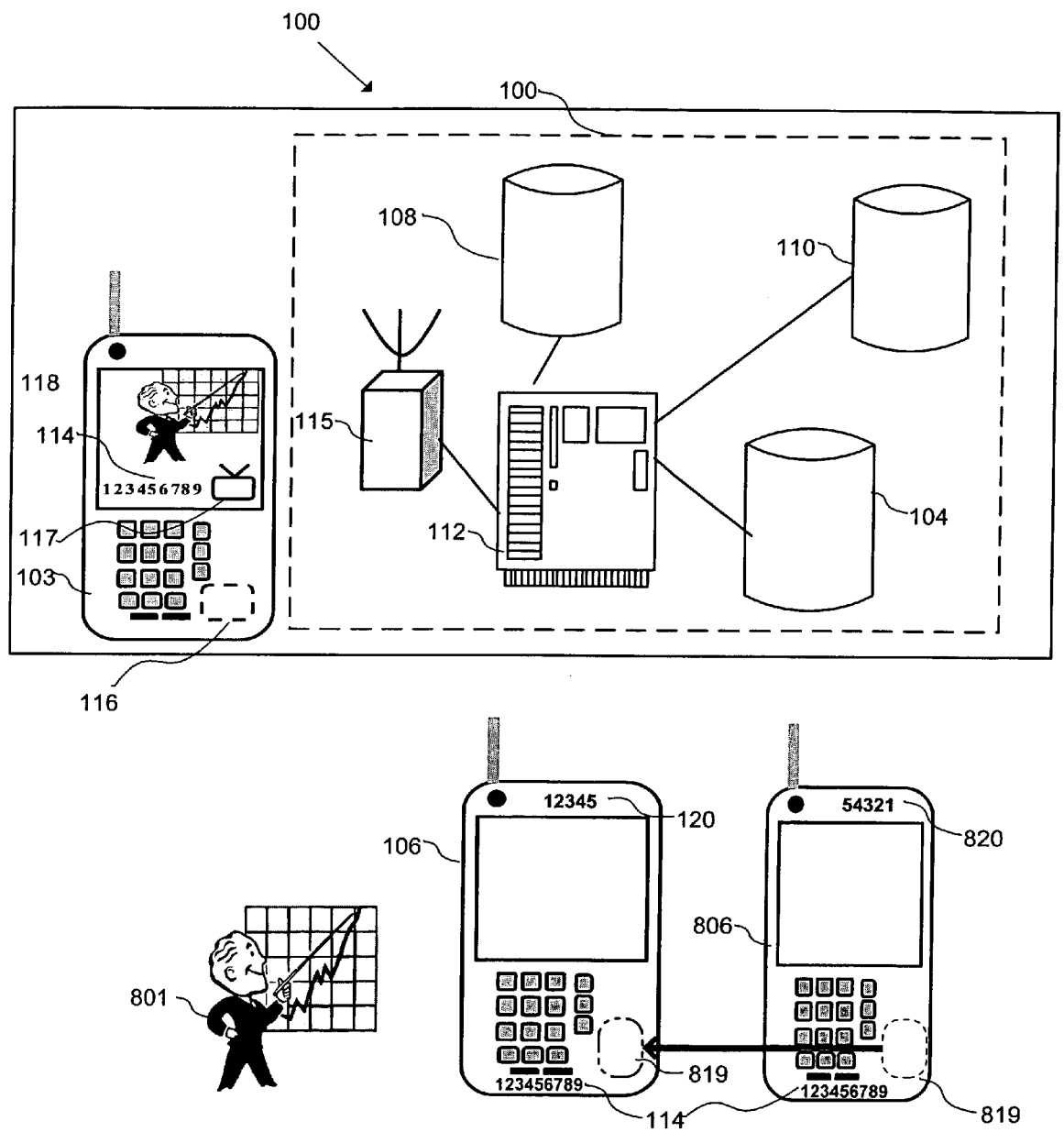
FIG. 8 illustrates operation of a system for alerting a mobile network subscriber of mobile station capabilities associated with a subscriber contact, when a contact changes mobile station hardware, in accordance with an exemplary embodiment of the present invention.

Other embodiments of the present invention provide methods to conveniently alert a network subscriber after a contact obtains MS equipment enhancements. As depicted in FIG. 8, a contact 801 of subscriber 101 changes mobile station equipment from MS 806 to MS 106. For example, MS 106 has videophone capability not present in MS 806. Preferably, MS 106 retains the same phone number 114 as previously used for MS 806. As illustrated in FIG. 8, subscriber identity module (SIM) 819 can be switched from MS 806 to MS 106. As is known to those skilled in the art, SIM 819 stores information such as phone number 114. SIM 819 also identifies that contact 801 who employs MS 106 is a legitimate user. Accordingly, after placing SIM 819 in MS 106, contact 801 may send and receive calls from MS 106 using phone number 114. However, since an IMEI number is unique to a mobile station, IMEI 120 in MS 106 is different from IMEI 820 in MS 806.

Figure 9A:
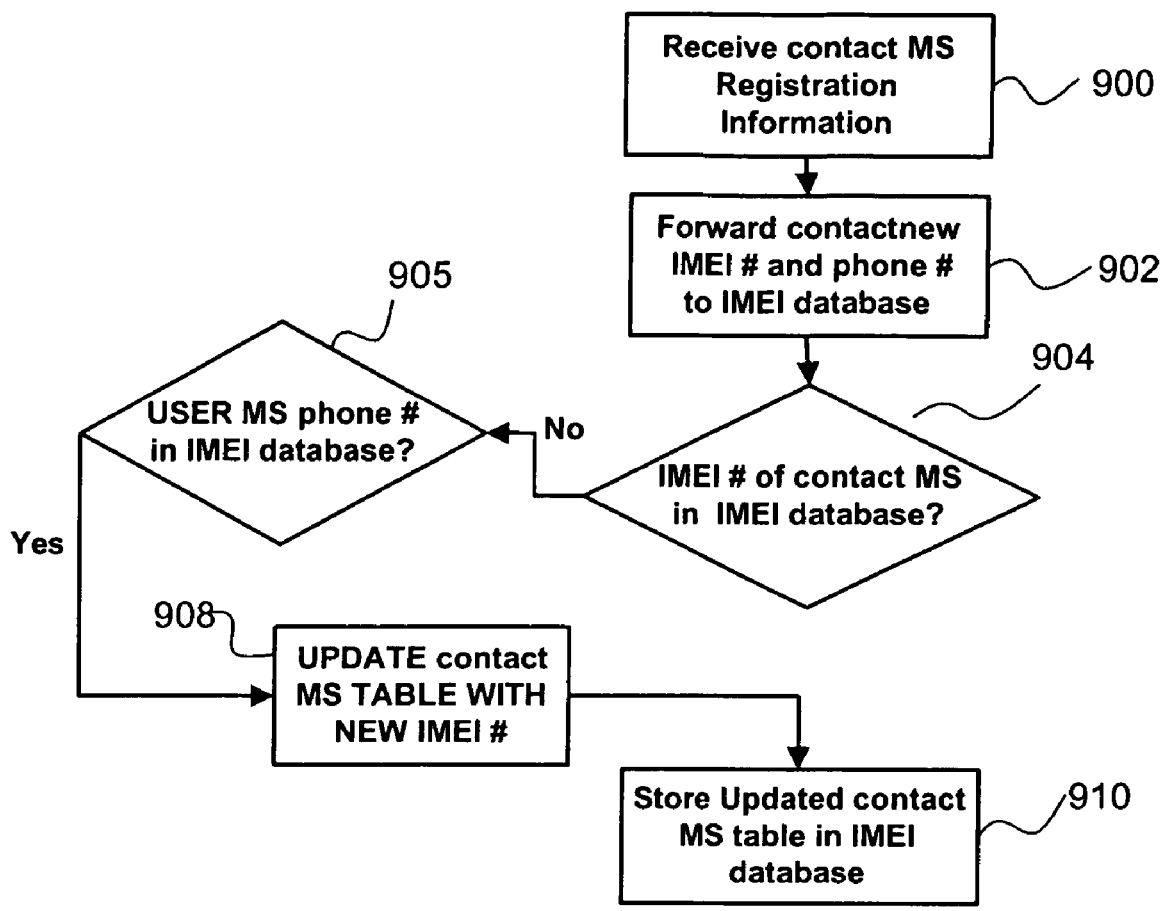
FIG. 9a illustrates exemplary steps in a process to update a table associated with a subscriber contact's phone number, according to an exemplary embodiment of the present invention.

FIG. 9a illustrates exemplary steps in a process to update a table associated with a subscriber contact's phone number, according to an exemplary embodiment of the present invention. Referring also to FIG. 8, in step 900, contact 801 registers MS 806 with system 100. As described above, the registration information sent to system 100 can include the phone number 114, and IMEI number 820 associated with the registering MS 106 may be requested by system 100.

In step 902, system 100 sends a message comprising registration information associated with MS 106 to IMEI database 110, as described above in more detail with reference to FIG. 5.

In step 904, system 100 checks to see if previous information associated with MS 106 is entered. The system determines that IMEI 120 is not contained in database 110.

Figure 10:
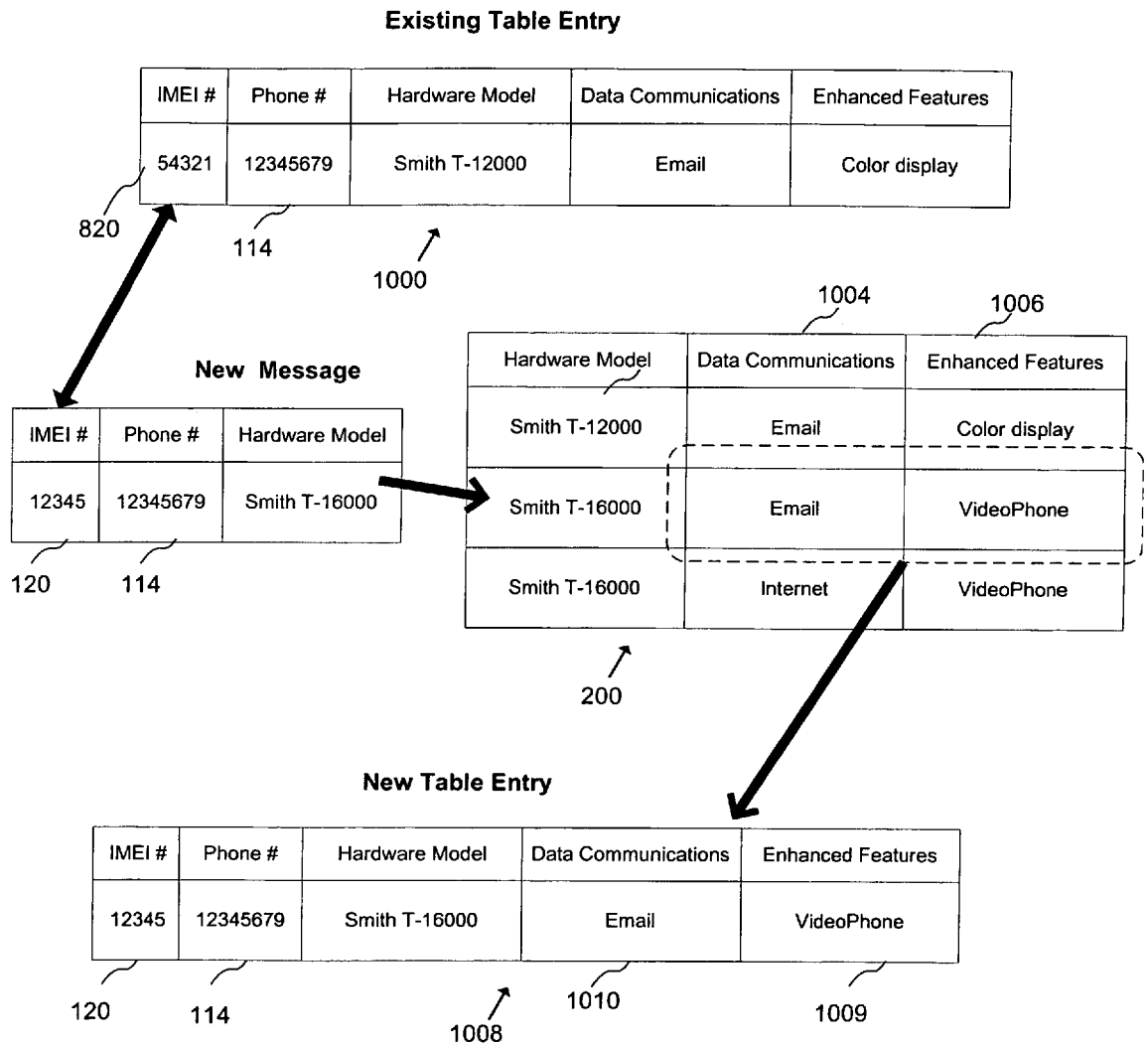
FIG. 10 illustrates exemplary tables used to create an updated user mobile station table, according to an exemplary embodiment of the present invention.

In step 906, as depicted in FIG. 10, system 100 retrieves table 1000 indicating that phone number 114 is contained in database 110, and is associated with IMEI 820 of MS 806. However, from the information received in registration of MS 106, the system recognizes that phone number 114 is now associated with MS 106 whose IMEI 120 is not in table 1000.

Accordingly, in step 908, a formatted table comprising information from the new message including IMEI 120 and phone number 114 of MS 106, is applied to existing hardware table 200. Existing hardware table 200 includes communications and features columns 1004 and 1006, respectively. Data from columns 1004 and 1006 are applied to the appropriate hardware model designated by IMEI 120 to create updated table 1008 that replaces table 1000. Thus, updated table 1008 indicates that phone number 114 is associated with a new IMEI 120 belonging to MS 106, with email (item 1010) and videotelephony (item 1009) capabilities.

In step 910, the updated table 1008 is stored in database 110 and replaces table 1000.

Figure 9B:
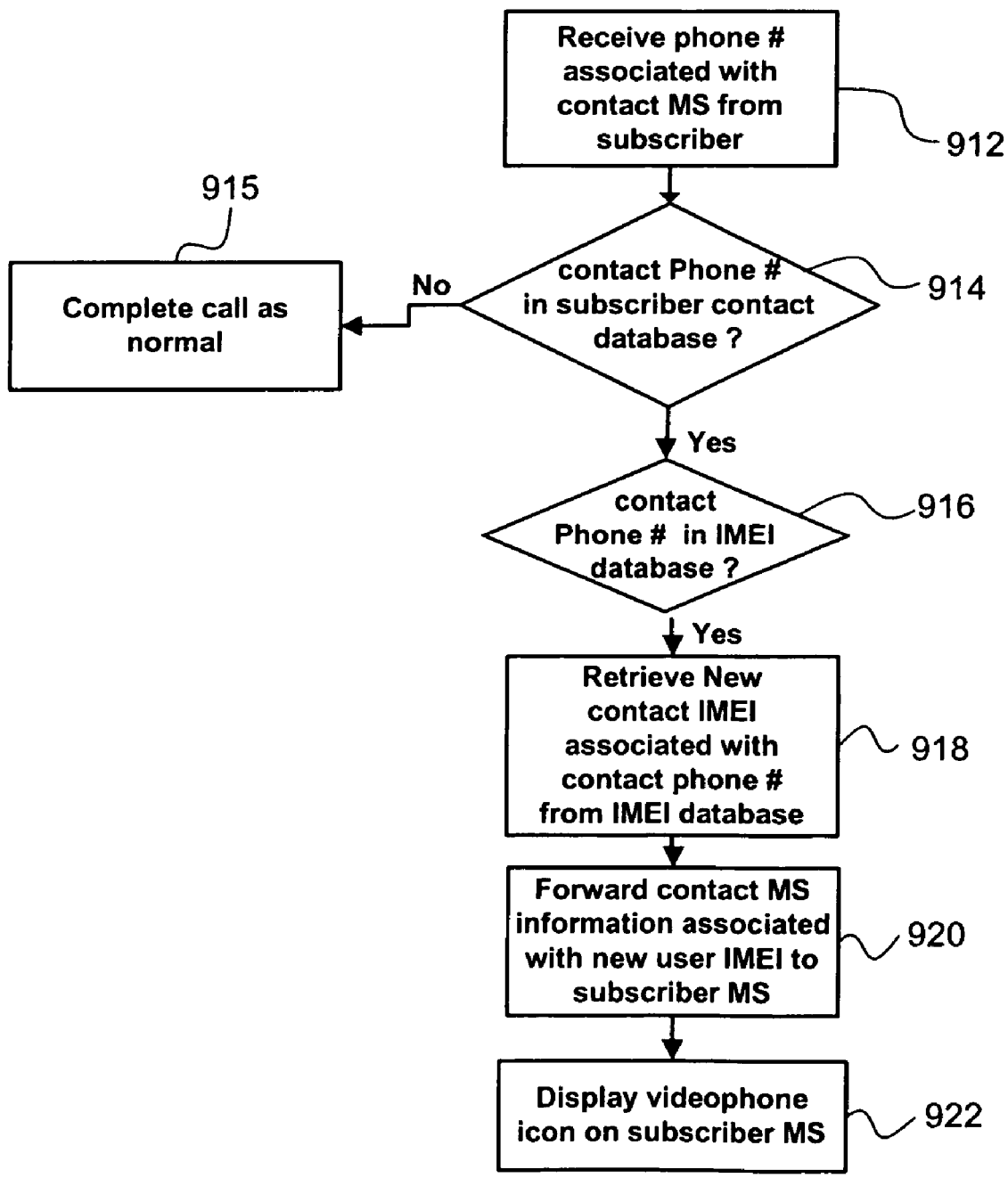
FIG. 9b illustrates exemplary steps in a process to alert a subscriber to changes in equipment associated with a subscriber contact's phone number, according to an exemplary embodiment of the present invention.

FIG. 9b illustrates exemplary steps in a process to alert a subscriber to changes in equipment associated with a subscriber contact's phone number, according to an exemplary embodiment of the present invention. In step 912, when subscriber 101 dials number 114.

In step 914, system 100 checks to see if the dialed number is in contact book database 108. If not, the call is afforded no further special treatment and proceeds as normal in step 915.

If system 100 determines that dialed number 114 is in contact book database 108, then it flags the called party as important, and in step 916, checks to determine if phone number 114 is in IMEI database 110.

In step 918, after determining that phone number 114 is resident in table 1008, system 100 retrieves information including item 1009 indicating videotelephony capability.

Subsequently, in step 920, a message containing item 1009 is sent to MS 101, and displayed graphically as an icon in step 922. Thus, the subscriber is updated to the fact that the contact with phone number 114 has obtained videotelephony capability. Accordingly, subscriber 101 can engage in a videotelephony session with contact 801 and observe the chart as depicted in FIG. 8.

Figure 11:
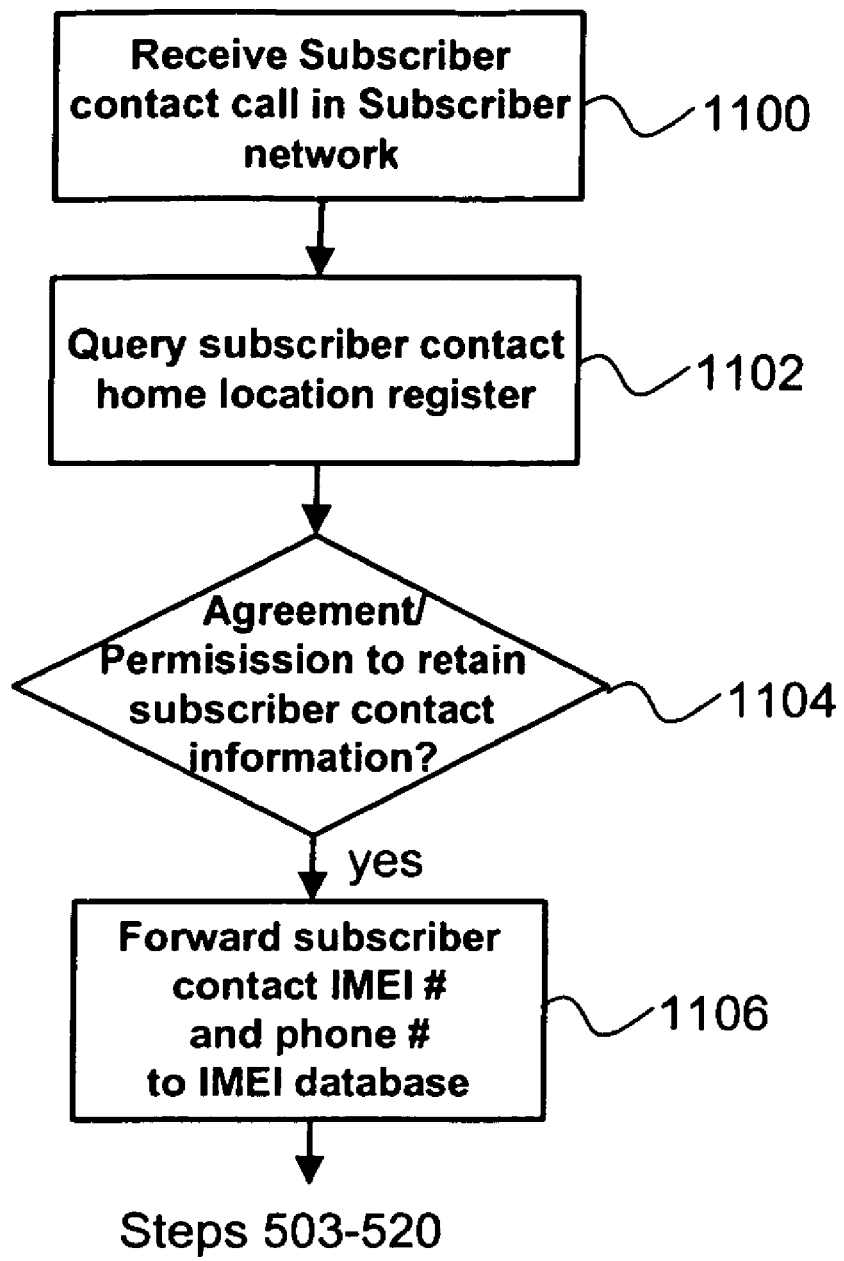
FIG. 11 depicts exemplary steps in a method for updating a mobile network subscriber concerning capabilities associated with a contact mobile station, according to an exemplary embodiment of the present invention.
Figure 12:
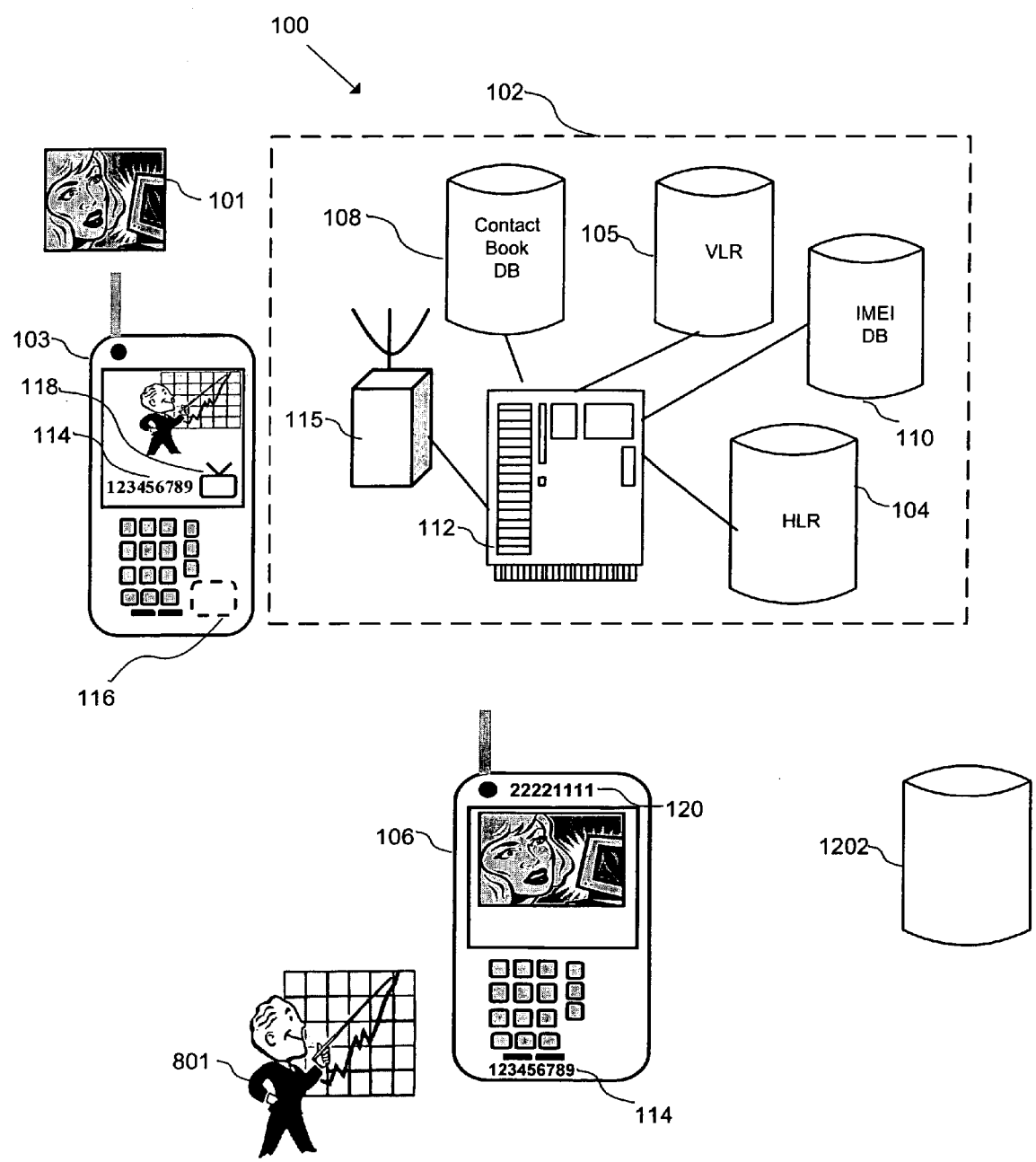
FIG. 12 illustrates a system for updating a mobile network subscriber of mobile station capabilities associated with a subscriber contact, according to an exemplary embodiment of the present invention.

FIG. 11 illustrates exemplary steps of a method for providing to a subscriber to a first mobile network information related to mobile station capability from a subscriber contact mobile station that is associated with a second mobile network, according to another embodiment of the present invention. Referring also to FIG. 12, in step 1100, mobile network 102 receives a call from a subscriber contact 801 who subscribes to a second mobile network. For example, contact 801 may be a subscriber to a different network (not shown) from network 102. Network 102 can begin to handle a call to subscriber contact 106 when the latter enters a region covered by network 102. In step 1102, a query is sent by network 102 to home location register 1202 of subscriber contact MS 106. System 100 may query for sufficient information to handle the subscriber contact call. Such information can be placed in a visitor location register 105 of network 102. In step 1104, system 100 determines whether permission exists to permanently retain additional information related to subscriber contact, such as IMEI 120 of MS 106. If permission exists, in step 1106, subscriber contact information including IMEI 120 is forwarded to database 110. Subsequently, the method proceeds as in steps 503 to 520 to alert a network subscriber 101 as to the videotelephony capabilities of MS 106.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for alerting a mobile network subscriber to capabilities of a contact mobile station associated with a contact of the network subscriber, comprising:
   receiving a contact mobile station IMEI number;
   storing the contact mobile station IMEI number together with data indicative of a set of predetermined features of the contact mobile station;
   receiving a message designating the contact of the mobile network subscriber;
   associating the contact with the contact mobile station IMEI number;
   retrieving a the data indicative of the set of predetermined features of the contact mobile station; and
   sending an alerting message to a mobile station associated with the mobile network subscriber, the alerting message including information to indicate the set of predetermined features.

2. The method of claim 1, wherein receiving a contact mobile station IMEI number occurs in response to receiving a registration message from the contact mobile station.

3. The method of claim 1, wherein storing the IMEI number together with the data indicative of the set of predetermined features comprises:
   in the IMEI database compiling a list of mobile station hardware model tables, each hardware model table comprising a hardware model and a set of capabilities associated with the hardware model; and
   in the IMEI database placing the contact mobile station IMEI number together with at least a phone number and hardware model associated with the contact mobile station.

4. The method of claim 3, wherein storing the contact mobile station IMEI number together with the data indicative of the set of predetermined features further comprises:
   in the IMEI database, placing the contact mobile station IMEI number together with at least one capability, the at least one capability corresponding to the mobile station hardware model designated by the contact mobile station IMEI number.

5. The method of claim 1, wherein associating the contact with the contact mobile station IMEI number comprises:
   checking a contact book database of the network subscriber to ascertain whether a contact phone number is contained therein;
   if a contact phone number is contained in the contact book database, checking the IMEI database of the network subscriber to ascertain whether the contact phone number is contained therein; and
   if a contact phone number is contained in the IMEI database, retrieving the contact mobile station IMEI number from a table containing the contact mobile station IMEI number and contact phone number.

6. The method of claim 1, wherein retrieving the data indicative of the set of predetermined features comprises retrieving the hardware capabilities associated with the contact mobile station from the IMEI database, based on the contact mobile station IMEI number.

7. The method of claim 1, wherein the set of predetermined features includes video telephony capability.

8. The method of claim 7, wherein the information to indicate the video telephony capability is displayed on the second mobile station as an icon together with information associated with the user of the contact mobile station.

9. The method of claim 1, wherein the message designating the contact of the network subscriber is a registration message from the contact mobile station.

10. The method of claim 1, wherein the message designating the contact of the network subscriber is a query message from a subscriber mobile station.

11. The method of claim 1, wherein the message designating the contact of the network subscriber is a call placed to the contact mobile station from a subscriber mobile station.

12. The method of claim 1, wherein the message designating the contact of the network subscriber is a call placed to a network subscriber mobile station from the contact mobile station.

13. The method of claim 1 wherein the information to indicate the set of predetermined features is an icon.

* * * * *